United States Patent
McGray et al.

(10) Patent No.: US 12,453,772 B2
(45) Date of Patent: Oct. 28, 2025

(54) TARGETING THE PVR AXIS USING CAR T CELL THERAPY AND COMBINATIONS

(71) Applicant: Roswell Park Cancer Institute Corporation, Buffalo, NY (US)

(72) Inventors: AJ Robert McGray, Hamilton (CN); Jessie Chiello, West Seneca, NY (US)

(73) Assignee: Roswell Park Cancer Institute Corporation, Buffalo, NY (US)

(*) Notice: Subject to any disclaimer, the term of this patent is extended or adjusted under 35 U.S.C. 154(b) by 0 days.

(21) Appl. No.: 18/999,456

(22) Filed: Dec. 23, 2024

(65) Prior Publication Data
US 2025/0205336 A1    Jun. 26, 2025

Related U.S. Application Data

(60) Provisional application No. 63/614,125, filed on Dec. 22, 2023.

(51) Int. Cl.
| | |
|---|---|
| *A61K 40/11* | (2025.01) |
| *A61K 40/31* | (2025.01) |
| *A61K 40/33* | (2025.01) |
| *A61K 40/42* | (2025.01) |
| *A61P 35/00* | (2006.01) |

(52) U.S. Cl.
CPC .............. *A61K 40/11* (2025.01); *A61K 40/31* (2025.01); *A61K 40/33* (2025.01); *A61K 40/4202* (2025.01); *A61K 40/421* (2025.01); *A61P 35/00* (2018.01)

(58) Field of Classification Search
CPC ................................ A61K 40/11; A61K 40/31
See application file for complete search history.

(56) References Cited

U.S. PATENT DOCUMENTS

| | | |
|---|---|---|
| 2022/0144952 A1 | 5/2022 | Klingemann et al. |
| 2022/0162288 A1 | 5/2022 | Richardson et al. |

FOREIGN PATENT DOCUMENTS

| | | |
|---|---|---|
| WO | 2015117229 A1 | 8/2015 |
| WO | 2022120191 A1 | 6/2022 |
| WO | 2023034781 A1 | 3/2023 |
| WO | 2023164698 A2 | 8/2023 |

OTHER PUBLICATIONS

McGray et al., "BITE secretion by adoptively transferred stem-like T cells improves FRa+ ovarian cancer control," Journal for ImmunoTherapy of Cancer, Jun. 23, 2023, vol. 11.
Kochenderfer, "FMC63-28Z receptor protein [synthetic construct]," NCBI, Jun. 11, 2012.
Kulemzin, "CD28-CD3z [Cloning vector pCDH-EF1a-mlgk-MCS-myc-CD28-CD3z-IRES-copGFP]," NCBI, Oct. 3, 2016.

*Primary Examiner* — Valarie E Bertoglio
(74) *Attorney, Agent, or Firm* — Hodgson Russ LLP

(57) ABSTRACT

Provided is a method of treating cancer in an individual by administering to the individual modified cells that express a chimeric antigen receptor (CAR) that contain a TIGIT extracellular domain that can bind to poliovirus receptor (PVR), a CD28 segment, and a CD3ζ segment. The modified cells may co-express and secrete a Bi-specific T cell engager (BiTE). The BiTE includes a segment that can specifically bind to human Folate Receptor alpha (FRα) and a segment that that can specifically bind to a human CD3☐ segment. Modified cells that express the CAR, and may also express and secrete the BiTE, and polynucleotides encoding the CAR and the BiTE, are also provided.

11 Claims, 13 Drawing Sheets
Specification includes a Sequence Listing.

**TIGIT ECD CAR:
'PVR CAR' T cells**

Mouse PVR CAR Design (mPVRCAR)

Human PVR CAR Design (hPVRCAR)

TARGETING THE PVR AXIS USING CAR T CELL THERAPY AND COMBINATIONS

CROSS REFERENCE TO RELATED APPLICATIONS

This application claims the benefit of U.S. provisional patent application No. 63/614,125, filed Dec. 22, 2023, the entire disclosure of which is incorporated herein by reference.

SEQUENCE LISTING

The instant application contains a sequence listing which has been submitted in .xml format and is hereby incorporated by reference in its entirety. Said .xml file is named "003551.01155.xml", was created on Dec. 23, 2024, and is 19,151 bytes in size.

RELATED INFORMATION

Cancer immunotherapies, including adoptive T cell transfer (ACT), have demonstrated impressive clinical activity, however their benefit in ovarian cancer (OC) and other cancers has generally been limited. There is an ongoing and unmet need for improved compositions and methods for treating cancer. The present disclosure is related to this need.

BRIEF SUMMARY

The disclosure provides modified cells, polynucleotides used to modify the cells, and methods of using the modified cells to treat cancer. The modified cells include but are not necessarily limited to modified T cells. The modified cells are modified to express a chimeric antigen receptor (CAR). The CAR comprises a T cell immunoreceptor with immunoglobulin and tyrosine-based inhibitory motif (TIGIT) extracellular domain that can bind to poliovirus receptor (PVR), a CD28 segment, and a CD3ζ segment. In some cases, the CAR-expressing cells are also modified to co-express and secrete a bi-specific T cell engager (BiTE). The BiTE includes a segment that can specifically bind to Folate Receptor alpha (FRα) and a segment that that can specifically bind to a human CD3ε segment. Representative and non-limiting examples of protein sequences of each of the components of the CAR and BiTE are provided in the detailed description below.

The present disclosure unexpectedly reveals that exclusion of a CD8 hinge region from the CAR design improves properties of the modified cells, relative to cells that express a CAR that contains an intact CD8 hinge region. The disclosure also unexpectedly reveals that the described approaches are useful for treating cancers that are characterized by mixed populations of cancer cells, some of which exhibit high expression of FRα, and some of which exhibit low or no detectable expression of FRα. This is shown by the demonstration that expression of PVR by FRα negative or low expressing cancer cells is increased in response to engagement of the BiTE with the FRα positive cancer cells. Thus, cells that are modified to express the combination of the described CAR and to secrete the described BiTE expand the range of cancer cells that can be targeted, relative to using cells that express either the BiTE or the CAR alone.

In a non-limiting example, a CAR of the disclosure comprises the sequence:

(SEQ ID NO: 5)
GSIILQCHLSSTTAQVTQVNWEQQDQLLAICNADLGWHISPSFKDRVAP
GPGLGLTLQSLTVNDTGEYFCIYHTYPDGTYTGRIFLEVLESSVAEHGA
RFQIPGSAIEVMYPPPYLDNEKSNGTIIHVKGKHLCPSPLFPGPSKPFW
VLVVVGGVLACYSLLVTVAFIIFWVRSKRSRLLHSDYMNMTPRRPGPTR
KHYQPYAPPRDFAAYRSRVKFSRSADAPAYQQGQNQLYNELNLGRREEY
DVLDKRRGRDPEMGGKPRRKNPQEGLYNELQKDKMAEAYSEIGMKGERR
RGKGHDGLYQGLSTATKDTYDALHMQALPPR.

In an example, a CAR construct of this disclosure may also comprise the sequence of SEQ ID NO:5 above, with the sequence MALPVTALLLPLALLLHAMMTGTIETTGNISAEKG (SEQ ID NO:6) at its N-terminus when initially translated but prior to being trafficked to the cell surface.

In a non-limiting example a BiTE that is secreted comprises the sequence:

(SEQ ID NO: 7)
MDIQMTQTTSSLSASLGDRVTISCRASQDIRNYLNWYQQKPDGTVKLLI
YYTSRLHSGVPSKFSGSGSGTDYSLTISNLEQEDIATYFCQQGNTLPWT
FAGGTKLEIKGGGGSGGGGSGGGGSGGGGSEVQLQQSGPELVKPGASMK
ISCKASGYSFTGYTMNWVKQSHGKNLEWMGLINPYKGVSTYNQKFKDKA
TLTVDKSSSTAYMELLSLTSEDSAVYYCARSGYYGDSDWYFDVWGQGTT
LTVFSGEAAAKEAAAKEAAAKDIELTQSPASLAVSLGQRAIISCKASQS
VSFAGTSLMHWYHQKPGQQPKLLIYRASNLEAGVPTRFSGSGSKTDFTL
NIHPVEEEDAATYYCQQSREYPYTFGGGTKLEIKGSTSGSGKSSEGKGQ
VQLQQSGAELVKPGASVKISCKASGYSFTGYFMNWVKQSHGKSLEWIGR
IHPYDGDTFYNQNFKDKATLTVDKSSNTAHMELLSLTSEDFAVYYCTRY
DGSRAMDYWGQGTTVTVS.

DETAILED DESCRIPTION

Figure 1A:
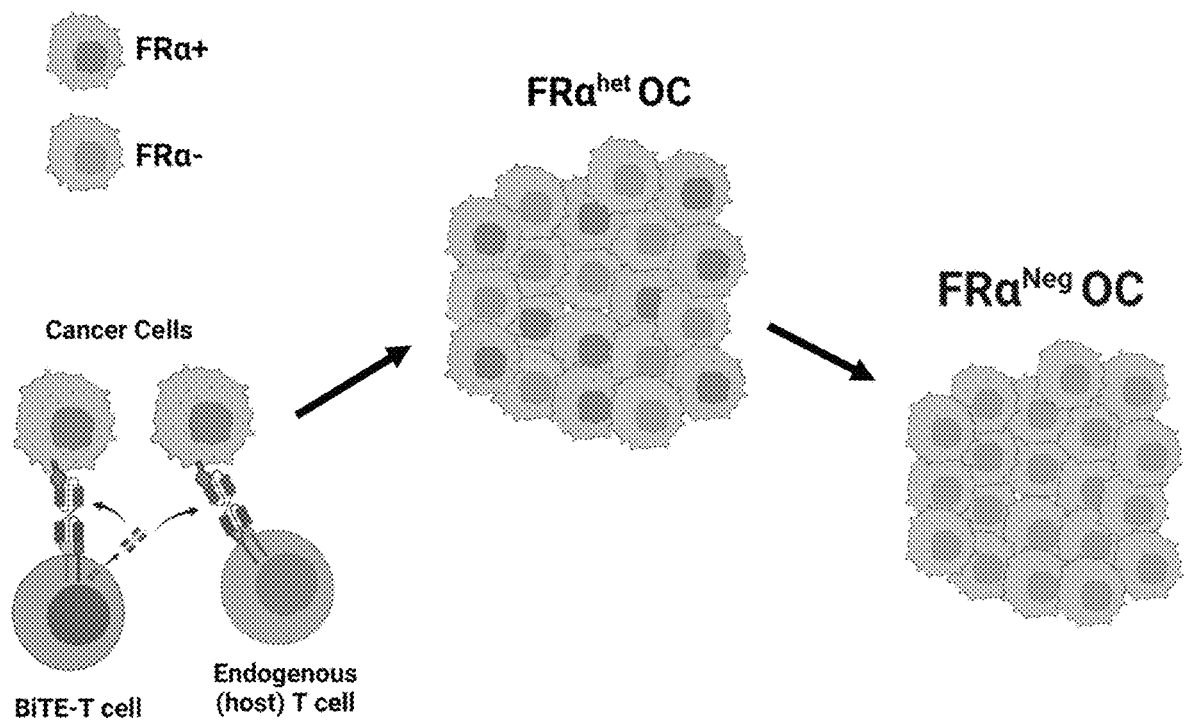
FIG. 1A. Schematic of FRα BiTE T cells targeting FRα+ cancer cells but unable to target FRα– cancer cells.

Unless defined otherwise herein, all technical and scientific terms used in this disclosure have the same meaning as commonly understood by one of ordinary skill in the art to which this disclosure pertains.

Every numerical range given throughout this specification includes its upper and lower values, as well as every narrower numerical range that falls within it, as if such narrower numerical ranges were all expressly written herein.

The disclosure includes all polynucleotide and amino acid sequences described herein. Amino acids of all protein sequences and all polynucleotide sequences encoding them are also included. The disclosure includes all amino acid and polynucleotide sequences that are identified herein by way of a database entry as the sequences exist in the database as of the effective filing date of this application.

The disclosure includes all compositions, results, and method steps alone and in combination, and described herein and as depicted in the Figures.

The present disclosure relates to modifying cells so that they express a chimeric antigen receptor (CAR) that binds to poliovirus receptor (PVR). Without intending to be bound by any particular theory, it is considered the presently described constructs differ from previously a described PVR CAR, at least because the presently provided CARs exclude all or segment of a CD8a hinge. In an example, the CAR does not comprise the sequence LSNSIMYFSHFVPVFL-PAKPTTTPAPRPPTPAPTIASQPLSLRPEACRPAAGG-AVHTRG LD (SEQ ID NO:10). In examples, the described 39 amino acid extracellular portion of CD28 that may be included in a described CAR is not considered to be or function as a CAR hinge. The disclosure demonstrates that cells that express such a PVR CAR without a described hinge segment exhibit improved properties relative to cells that express a similar PVR CAR but include a described CD8a hinge.

The PVR CAR can be used alone, or combined with an approach where the cells modified to express the PVR CAR are further modified such that they secrete a Bispecific T-cell engager (BiTE) that specifically binds to Folate Receptor alpha (FRα) and CD3 epsilon to thereby enhance cancer cell killing relative to use of PVR CAR cells alone. BiTEs that specifically bind to FRα and CD3 epsilon are described in PCT/US23/63359, published as WO 2023/164698 on Aug. 21, 2023, the disclosure of which is incorporated herein by reference. Thus, in examples, the disclosure includes using cells that express the described PVR CAR as a single therapeutic agent. Likewise, the disclosure includes cells modified to express only the described PVR CAR, and polynucleotides that encode the PVR CAR but do not also encode a described BiTE.

As described in WO 2023/164698, in an example, a described BiTE comprises an anti-human CD3ε scFv with a VL/VH sequence:

```
                                           (SEQ ID NO: 4)
MDIQMTQTTSSLSASLGDRVTISCRASQDIRNYLNWYQQKPDGTVKLLI

YYTSRLHSGVPSKFSGSGSGTDYSLTISNLEQEDIATYFCQQGNTLPWT

FAGGTKLEIKGGGGSGGGGSGGGGSGGGGSEVQLQQSGPELVKPGASMK

ISCKASGYSFTGYTMNWVKQSHGKNLEWMGLINPYKGVSTYNQKFKDKA

TLTVDKSSSTAYMELLSLTSEDSAVYYCARSGYYGDSDWYFDVWGQGTT

LTVFS.
```

In an example, a described BiTE comprises anti-human FRα scFv comprising a VL/VH sequence:

```
                                           (SEQ ID NO: 3)
DIELTQSPASLAVSLGQRAIISCKASQSVSFAGTSLMHWYHQKPGQQPK

LLIYRASNLEAGVPTRESGSGSKTDFTLNIHPVEEEDAATYYCQQSREY

PYTFGGGTKLEIKGSTSGSGKSSEGKGQVQLQQSGAELVKPGASVKISC

KASGYSFTGYFMNWVKQSHGKSLEWIGRIHPYDGDTFYNQNFKDKATLT

VDKSSNTAHMELLSLTSEDFAVYYCTRYDGSRAMDYWGQGTTVTVS.
```

In an example, the BiTE, prior to secretion, comprises the sequence:

(SEQ ID NO: 8)
MNSGLQLVFFVLTLKGIQGMDIQMTQTTSSLSASLGDRVTISCRASQDI

RNYLNWYQQKPDGTVKLLIYYTSRLHSGVPSKFSGSGSGTDYSLTISNL

EQEDIATYFCQQGNTLPWTFAGGTKLEIKGGGGSGGGGSGGGGSGGGGS

EVQLQQSGPELVKPGASMKISCKASGYSFTGYTMNWVKQSHGKNLEWMG

LINPYKGVSTYNQKFKDKATLTVDKSSSTAYMELLSLTSEDSAVYYCAR

SGYYGDSDWYFDVWGQGTTLTVFSGEAAAKEAAAKEAAAKDIELTQSPA

SLAVSLGQRAIISCKASQSVSFAGTSLMHWYHQKPGQQPKLLIYRASNL

EAGVPTRFSGSGSKTDFTLNIHPVEEEDAATYYCQQSREYPYTFGGGTK

LEIKGSTSGSGKSSEGKGQVQLQQSGAELVKPGASVKISCKASGYSFTG

YFMNWVKQSHGKSLEWIGRIHPYDGDTFYNQNFKDKATLTVDKSSNTAH

MELLSLTSEDFAVYYCTRYDGSRAMDYWGQGTTVTVS.

In an example, a signal sequence is removed before secretion of the BiTE. In an example, the signal sequence comprises the sequence MNSGLQLVFFVLTLKGIQG (SEQ ID NO:9). As such, in examples, the secreted BiTE comprises the sequence:

(SEQ ID NO: 7)
MDIQMTQTTSSLSASLGDRVTISCRASQDIRNYLNWYQQKPDGTVKLLI

YYTSRLHSGVPSKFSGSGSGTDYSLTISNLEQEDIATYFCQQGNTLPWT

FAGGTKLEIKGGGGSGGGGSGGGGSGGGGSEVQLQQSGPELVKPGASMK

ISCKASGYSFTGYTMNWVKQSHGKNLEWMGLINPYKGVSTYNQKFKDKA

TLTVDKSSSTAYMELLSLTSEDSAVYYCARSGYYGDSDWYFDVWGQGTT

LTVFSGEAAAKEAAAKEAAAKDIELTQSPASLAVSLGQRAIISCKASQS

VSFAGTSLMHWYHQKPGQQPKLLIYRASNLEAGVPTRESGSGSKTDFTL

NIHPVEEEDAATYYCQQSREYPYTFGGGTKLEIKGSTSGSGKSSEGKGQ

VQLQQSGAELVKPGASVKISCKASGYSFTGYFMNWVKQSHGKSLEWIGR

IHPYDGDTFYNQNFKDKATLTVDKSSNTAHMELLSLTSEDFAVYYCTRY

DGSRAMDYWGQGTTVTVS.

The disclosure provides a method comprising introducing a population of modified cells as in described herein into an individual in need of treatment for cancer to thereby treat the cancer, which may exhibit FRα expression heterogeneity. In examples, engagement of FRα positive cancer cells by the Bispecific T-cell engager increases expression of PVR on cancer cells that exhibit low expression of FRα. Expression levels, and relative expression levels as between normal and cancer cells, and between cancer cells, of FRα for any particular individual's cancer cells can be determined by those skilled in the art, such as by comparing FRα expression to a reference value. In examples, relative expression of FRα between different cell types can be determined as described in McGray A J R, et al. J Immunother Cancer 2023; 11:e006863. doi:10.1136/jitc-2023-006863, the disclosure of which is incorporated herein by reference.

In non-limiting examples, the disclosure includes administering soluble PVR-Fc to an individual to weaken the effects of the CAR as a mechanism of enhancing safety and/or limiting PVR-directed targeting by engineered T cells. In an example, the disclosure includes administering an anti-TIGIT antibody to weaken the effect of the CAR. Non-limiting examples of anti-TIGIT antibodies include Vibostolimab (Merck), Etigilimab (Mereo BioPharma), Tiragolumab (Roche), EOS-448 (iTeos), Domvanalimab (Arcus BioSciences), Ociperlimab (Beigene/Novartis).

In the Examples and experiments described below, the secreted FR-B comprises the sequence:

(SEQ ID NO: 11)
EVQLVESGGGLVQPGKSLKLSCEASGFTFSGYGMHWVRQAPGRGLESVA

YITSSSINIKYADAVKGRFTVSRDNAKNLLFLQMNILKSEDTAMYYCAR

FDWDKNYWGQGTMVTVSSGGGGSGGGGSGGGGSDIQMTQSPSSLPASLG

DRVTINCQASQDISNYLNWYQQKPGKAPKLLIYYTNKLADGVPSRFSGS

GSGRDSSFTISSLESEDIGSYYCQQYYNYPWTFGPGTKLEIKGEAAAKE

AAAKEAAAKDIELTQSPASLAVSLGQRAIISCKASQSVSFAGTSLMHWY

HQKPGQQPKLLIYRASNLEAGVPTRESGSGSKTDFTLNIHPVEEEDAAT

YYCQQSREYPYTFGGGTKLEIKGSTSGSGKSSEGKGQVQLQQSGAELVK

PGASVKISCKASGYSFTGYFMNWVKQSHGKSLEWIGRIHPYDGDTFYNQ

NFKDKATLTVDKSSNTAHMELLSLTSEDFAVYYCTRYDGSRAMDYWGQG

TTVTVS.

This is a chimeric BiTE that comprises a murine targeted CD3ε scFv and a human targeted FRα scFv. Accordingly, this construct binds the human target FRα antigen and mouse CD3ε. This construct is used for proof-of-principal demonstrations using syngeneic immunocompetent mouse models. These results support feasibility of using a described BiTE that binds to human CD3ε and human FRα in combination with a described CAR.

In examples, any protein of this disclosure may comprise linking sequences. Suitable amino acid linkers may be mainly composed of relatively small, neutral amino acids, such as glycine, serine, and alanine, and can include multiple copies of a sequence enriched in glycine and serine. In specific and non-limiting examples, the linker comprises 3, 4, 5, 6, 7, 8, 9, 10, 11, 12, 13, 14, 15, 16, 17, 18, 19, and 20 amino acids. Linking sequences are provided in certain sequences described below. In examples, such as for proteins that are produced as a fusion protein, a peptide linker may be used, and may comprise a cleavable or non-cleavable linker. In examples, the peptide linker comprises any self-cleaving signal. In examples, the self-cleaving signal may be present in the same open reading frame (ORF) as the ORF that encodes a described protein. A self-cleaving amino acid sequence is typically about 18-22 amino acids long. Any suitable sequence can be used, non-limiting examples of which include: T2A, P2A, E2A, and F2A, the sequences of which are known in the art.

In examples, a protein of this disclosure may include a secretion signal, a representative example of which is described above.

For therapeutic approaches, in certain examples, one or more described constructs may be delivered as mRNA or DNA polynucleotides that encode the described constructs. It is considered that administering a DNA or RNA encoding any described constructs is also a method of delivering the proteins they encode to an individual or to one or more cells, provided the DNA is transcribed and the mRNA is translated, and/or the RNA itself is delivered and translated. Methods of delivering DNA and RNAs encoding proteins are known in the art and can be adapted to deliver the constructs, given the benefit of the present disclosure. In examples, one or more expression vectors are used and comprise viral vectors. Thus, in examples, a viral expression vector is used. Viral expression vectors may be used as naked polynucleotides, or may comprises any of viral particles, including but not limited to defective interfering particles or other replication defective viral constructs, and virus-like particles. In examples, the expression vector comprises a modified viral polynucleotide, such as from an adenovirus, a herpesvirus, or a retroviral vector. In examples, the retroviral vector is adapted from a murine Moloney leukemia virus (MLV) or a lentiviral vector may be used, such as a lentiviral vector adapted from human immunodeficiency virus type 1 (HIV-1).

In alternative examples, a recombinant adeno-associated virus (AAV) vector may be used. In certain examples, the expression vector is a self-complementary adeno-associated virus (scAAV).

In examples, cells modified according to this disclosure include mature T cells, or their progenitor cells such hematopoietic stem cells or any other time of T cell progenitor cells. The disclosure includes progeny of progenitor cells. Thus, in examples, cells that are modified to express any construct described herein include but are not necessarily limited CD4+ T cells, CD8+ T cells, Natural Killer T cells, γδ T cells, and cells that are progenitors of T cells, such as hematopoietic stem cells or other lymphoid progenitor cells, immature thymocytes (double-negative CD4−CD8−) cells, or double-positive thymocytes (CD4+CD8+). In examples, the progenitor cells comprise markers, such as CD34, CD117 (c-kit) and CD90 (Thy-1). In examples, a population of human peripheral blood mononuclear cells are modified using the described polynucleotides.

Pharmaceutical formulations containing the described constructs are included in the disclosure, and can be prepared by mixing them with one or more pharmaceutically acceptable carriers. Pharmaceutically acceptable carriers include solvents, dispersion media, isotonic agents and the like. The carrier can be liquid, semi-solid, e.g. pastes, or solid carriers. Examples of carriers include water, saline solutions or other buffers (such as phosphate, citrate buffers), oil, alcohol, proteins (such as serum albumin, gelatin), carbohydrates (such as monosaccharides, disaccharides, and other carbohydrates including glucose, sucrose, trehalose, mannose, mannitol, sorbitol or dextrins), gel, lipids, liposomes, resins, porous matrices, binders, fillers, coatings, stabilizers, preservatives, liposomes, antioxidants, chelating agents such as EDTA; salt forming counter-ions such as sodium; non-ionic surfactants such as TWEEN, PLURONICS or polyethylene glycol (PEG), or combinations thereof.

In examples, an effective amount of T cells expressing a described CAR, and which may also express a described BiTE, are administered. In examples, a combination of cells modified to express a described CAR and a combination of cells modified to express a described BiTE may be used.

In examples, an effective amount of modified cells is an amount that reduces one or more signs or symptoms of a disease and/or reduces the severity of the disease. An effective amount may also inhibit or prevent the onset of a disease or a disease relapse. A precise dosage can be selected by the individual physician in view of the patient to be treated. Dosage and administration can be adjusted to provide sufficient levels of a described construct/modified cells to maintain the desired effect. Additional factors that may be taken into account include the severity and type of the disease state, age, weight and gender of the patient, desired duration of treatment, method of administration, time and frequency of administration, drug combination(s), reaction sensitivities, and/or tolerance/response to therapy.

The modified cells can be administered directly or provided as pharmaceutical compositions and administered to an individual in need thereof using any suitable route, examples of which include intravenous, intramuscular, intraperitoneal, intracerobrospinal, subcutaneous, intra-articular, intrasynovial, oral, topical, or inhalation routes, depending on the particular condition being treated. Intra-tumor injections may also be used. The compositions may be administered parenterally or enterically. The compositions may be introduced as a single administration or as multiple administrations or may be introduced in a continuous manner over a period of time, non-limiting examples of which are demonstrated herein.

In examples, the described compositions are suitable for use in humans. The disclosure also includes the described constructs that are suitable for use in syngeneic immunocompetent mouse models.

In examples, the individual in need of a composition of this disclosure has been diagnosed with or is suspected of having cancer. In examples, the cancer is a solid or liquid tumor. In examples, the cancer is renal cell carcinoma, breast cancer, prostate cancer, pancreatic cancer, lung cancer, liver cancer, ovarian cancer, cervical cancer, colon cancer, esophageal cancer, glioma, glioblastoma, or another brain cancer, stomach cancer, bladder cancer, testicular cancer, head and neck cancer, melanoma or another skin cancer, any sarcoma, including but not limited to fibrosarcoma, angiosarcoma, adenocarcinoma, and rhabdomyosarcoma, and any blood cancer, including all types of leukemia, lymphoma, and myeloma.

In examples, administering a described construct, such as by way of administering T cells that are modified to secrete the described binding partner (i.e., the BiTES) and to express a PVR CAR, exhibits an improved activity relative to a control. In an example, the described combination is more effective at killing or inhibiting growth of a population of cancer cells that include FRα positive/high and FRα negative/low cells.

The described modified T cells that express the described constructs can be combined with any other therapeutic agent, non-limiting examples of which include conventional chemotherapeutic agents, and immune checkpoint inhibitors. The described constructs and modified cells may also be combined with any other form of adoptive immunotherapy. The modified T cells may be used in autologous or allogenic therapies.

The disclosure includes the described expression vectors that encode described constructs, all methods of making T cells that are described herein and by way of the figures. The disclosure provides non-limiting examples of examples that are illustrated in the Figures. The results described in the Figures were produced using the following sequences of described constructs. The amino acids of any purification tag, such as a His tag, may be excluded from the sequences of this disclosure. Representative sequences of this disclosure are as follows:

PVR CAR: Ligand-Based CAR Utilizing TIGIT Extracellular Domain
Mouse PVR CAR
PVR CAR Design: Leader—TIGIT Extracellular Domain—CD8 Hinge—CD28 Transmembrane/Signaling domain—CD3ζ signaling domain

```
Leader Sequence (Mouse kappa light chain):
                                                  (SEQ ID NO: 12)
MDFQVQIFSFLLISASVIMSR Mouse TIGIT Extracellular Domain (ECD; 29-148):
                                                  (SEQ ID NO: 13)
TIDTKRNISAEEGGSVILQCHFSSDTAEVTQVDWKQQDQLLAIYSVDLGWHVASVFS

DRVVPGPSLGLTFQSLTMNDTGEYFCTYHTYPGGIYKGRIFLKVQESSDDRNGLAQF

QTAPLG

CD8 Hinge:
                                                  (SEQ ID NO: 14)
VISNSVMYFSSVVPVLQKVNSTTTKPVLRTPSPVHPTGTSQPQRPEDCRPRGSVKGTG

LDFA

CD28TM/Signaling Domain:
                                                  (SEQ ID NO: 15)
FWALVVVAGVLFCYGLLVTVALCVIWTNSRRNRLLQSDYMNMTPRRPGLTRKPYQ

PYAPARDFAAYRP

CD3ζ Signaling Domain:
                                                  (SEQ ID NO: 16)
LRAKFSRSAETAANLQDPNQLYNELNLGRREEYDVLEKKRARDPEMGGKQQRRRN

PQEGVYNALQKDKMAEAYSEIGTKGERRRGKGHDGLYQGLSTATKDTYDALHMQT

LAPR

Full Sequence: Short linker sequence between mTIGIT ECD and CD8 Hinge
(Bold and italics)
                                                  (SEQ ID NO: 17)
MDFQVQIFSFLLISASVIMSRTIDTKRNISAEEGGSVILQCHFSSDTAEVTQVDWKQQDQ

LLAIYSVDLGWHVASVFSDRVVPGPSLGLTFQSLTMNDTGEYFCTYHTYPGGIYKGR

IFLKVQESSDDRNGLAQFQTAPLGRIRLSSAVISNSVMYFSSVVPVLQKVNSTTTKPV

LRTPSPVHPTGTSQPQRPEDCRPRGSVKGTGLDFAFWALVVVAGVLFCYGLLVTVAL

CVIWTNSRRNRLLQSDYMNMTPRRPGLTRKPYQPYAPARDFAAYRPLRAKFSRSAE

TAANLQDPNQLYNELNLGRREEYDVLEKKRARDPEMGGKQQRRRNPQEGVYNALQ

KDKMAEAYSEIGTKGERRRGKGHDGLYQGLSTATKDTYDALHMQTLAPR
```

Human PVR CAR (hPVR-h28Z)
PVR CAR Design: Leader—TIGIT Extracellular Domain—CD28 domains (terminal 39 AA of extracellular/transmembrane/intracellular signaling)—CD3ζ intracellular signaling domain (lacks hinge)

```
Leader Sequence (Human CD8a):
                                                  (SEQ ID NO: 6)
MALPVTALLLPLALLLHA Human TIGIT Extracellular Domain (ECD; 22-141):
                                                  (SEQ ID NO: 1)
MMTGTIETTGNISAEKGGSIILQCHLSSTTAQVTQVNWEQQDQLLAICNADLGWHISP

SFKDRVAPGPGLGLTLQSLTVNDTGEYFCIYHTYPDGTYTGRIFLEVLESSVAEHGAR

FQIP
```

-continued

Human CD28/CD3ζ Domains
(SEQ ID NO: 2)

IEVMYPPPYLDNEKSNGTIIHVKGKHLCPSPLFPGPSKPFWVLVVVGGVLACYSLLVT

VAFIIFWVRSKRSRLLHSDYMNMTPRRPGPTRKHYQPYAPPRDFAAYRSRVKESRSA

DAPAYQQGQNQLYNELNLGRREEYDVLDKRRGRDPEMGGKPRRKNPQEGLYNELQ

KDKMAEAYSEIGMKGERRRGKGHDGLYQGLSTATKDTYDALHMQALPPR

Full Sequence: linker between hTIGIT ECD and CD28/CD3ζ (italicized + bold)
(SEQ ID NO: 5)

MALPVTALLLPLALLLHAMMTGTIETTGNISAEKGGSIILQCHLSSTTAQVTQVNWE

QQDQLLAICNADLGWHISPSFKDRVAPGPGLGLTLQSLTVNDTGEYFCIYHTYPDGT

YTGRIFLEVLESSVAEHGARFQIP*GSA*IEVMYPPPYLDNEKSNGTIIHVKGKHLCPSPL

FPGPSKPFWVLVVVGGVLACYSLLVTVAFIIFWVRSKRSRLLHSDYMNMTPRRPGPT

RKHYQPYAPPRDFAAYRSRVKFSRSADAPAYQQGQNQLYNELNLGRREEYDVLDK

RRGRDPEMGGKPRRKNPQEGLYNELQKDKMAEAYSEIGMKGERRRGKGHDGLYQ

GLSTATKDTYDALHMQALPPR

*hPVR-CD8 hinge-h28Z Design for comparison (found to be non-functional)
CAR Design with CD8 Hinge: Leader-TIGIT ECD-CD8 hinge (Portion of CD8α
Extracellular Domain; 118-178)-CD28 domains (KP from Extracellular/Transmembrane/Intracellular signaling)-CD3ζ intracellular
signaling domain
(SEQ ID NO: 10)

MALPVTALLLPLALLLHAMMTGTIETTGNISAEKGGSIILQCHLSSTTAQVTQVNWE

QQDQLLAICNADLGWHISPSFKDRVAPGPGLGLTLQSLTVNDTGEYFCIYHTYPDGT

YTGRIFLEVLESSVAEHGAR-
FQIPGSA<u>*LSNSIMYFSHFVPVFLPAKPTTTPAPRPPTPAPTIASQPLSLRPEACRPAAGGAVHTRGLD*</u>

KPFWVLVVVGGVLACYSLLVTVAFIIFWVRSKRSRLLHSDYMNMTPRR

PGPTRKHYQPYAPPRDFAAYRSRVKFSRSADAPAYQQGQNQLYNELNLGRREEYDV

LDKRRGRDPEMGGKPRRKNPQEGLYNELQKDKMAEAYSEIGMKGERRRGKGHDGL

YQGLSTATKDTYDALHMQALPPR

Hinge segment is superscripted, "KP" sequence following hinge are last two amino acids of CD28 extracellular domain, followed by TM CD28 domain, followed intracellular CD28 and CD3ζ domains.

The following Examples are illustrated by the Figures and are not intended to be limiting:

Example 1

Figure 1B:
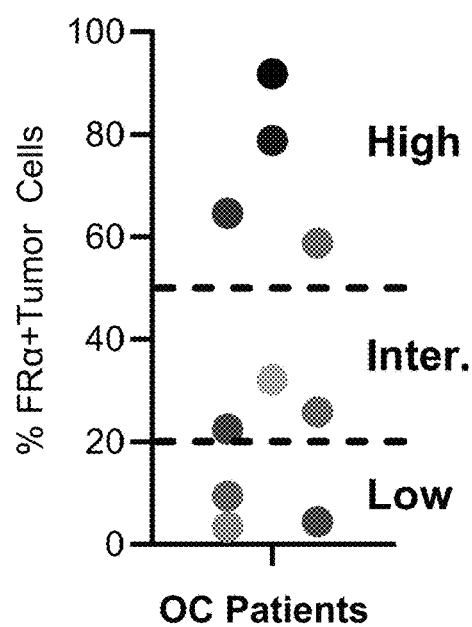
FIG. 1B. % FRα+ cancer cells across tested Ovarian Cancer (OC) patients specimens (n=10; Cohort #1).

Example 1 relates to FIG. 1 and the therapeutic challenge posed by FRα heterogeneity. FIG. 1A. depicts a schematic of FRα BiTE T cells targeting FRα+ cancer cells but unable to target FRα– cancer cells. This demonstrates the challenge of heterogenous tumor in that targeting one tumor antigen can lead to the tumor outgrowth through immune escape. FIG. 1B shows the % FRα+ cancer cells across tested Ovarian Cancer (OC) patients specimens (n=10; Cohort #1). This demonstrates that expression of FRα is variable across OC patients and relates to the described methods of treating cancer that includes cancer cells with differing levels of FRα expression, as shown in Example 2.

Example 2

Figures 2A, 2B, 2C:
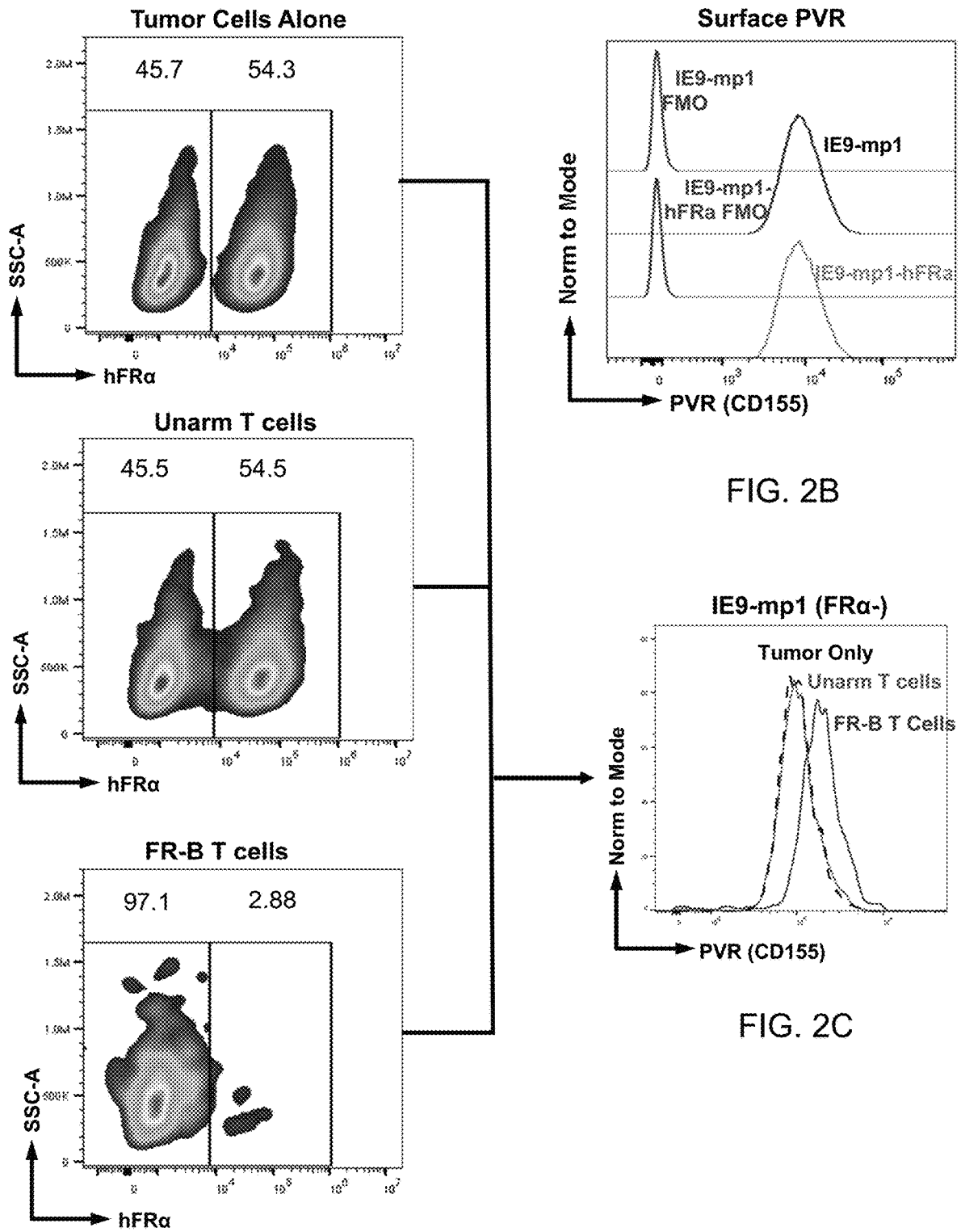
FIG. 2A. IE9-mp1 (FRα–) and IE9-mp1-hFRa (FRα+) OC cells were mixed 50:50 and co-cultured with Unarmed control or FR-B T cells for 72 hrs (4:1 E:T Ratio).
FIG. 2B. Surface expression of PVR on IE9-mp1 and IE9-mp1-hFRa cells at baseline. Fluorescence minus one (FMO) staining controls included for comparison.
FIG. 2C. PVR expression on IE9-mp1 (FRα–) tumor cells post co-culture as shown in A).

This Example relates to FIG. 2, and that targeting FRα heterogenous OC with folate receptor BiTE-secreting FR-B T cells drives outgrowth of FRα negative tumor cells, but upregulation of PVR, representing a therapeutic opportunity to address the challenge described in Example 1. The data in FIG. 2A demonstrates outgrowth of predominantly FRα– tumor cells following FR-B T cell activity. The data in FIG. 2B demonstrate endogenous PVR surface expression on target cells. The data in FIG. 2C demonstrate further upregulation of PVR on FRα– tumor cells following FR-B T cell targeting of adjacent FRα+OC cells and supports increased targetability using PVR-directed agents.

Example 3

Figure 3A:
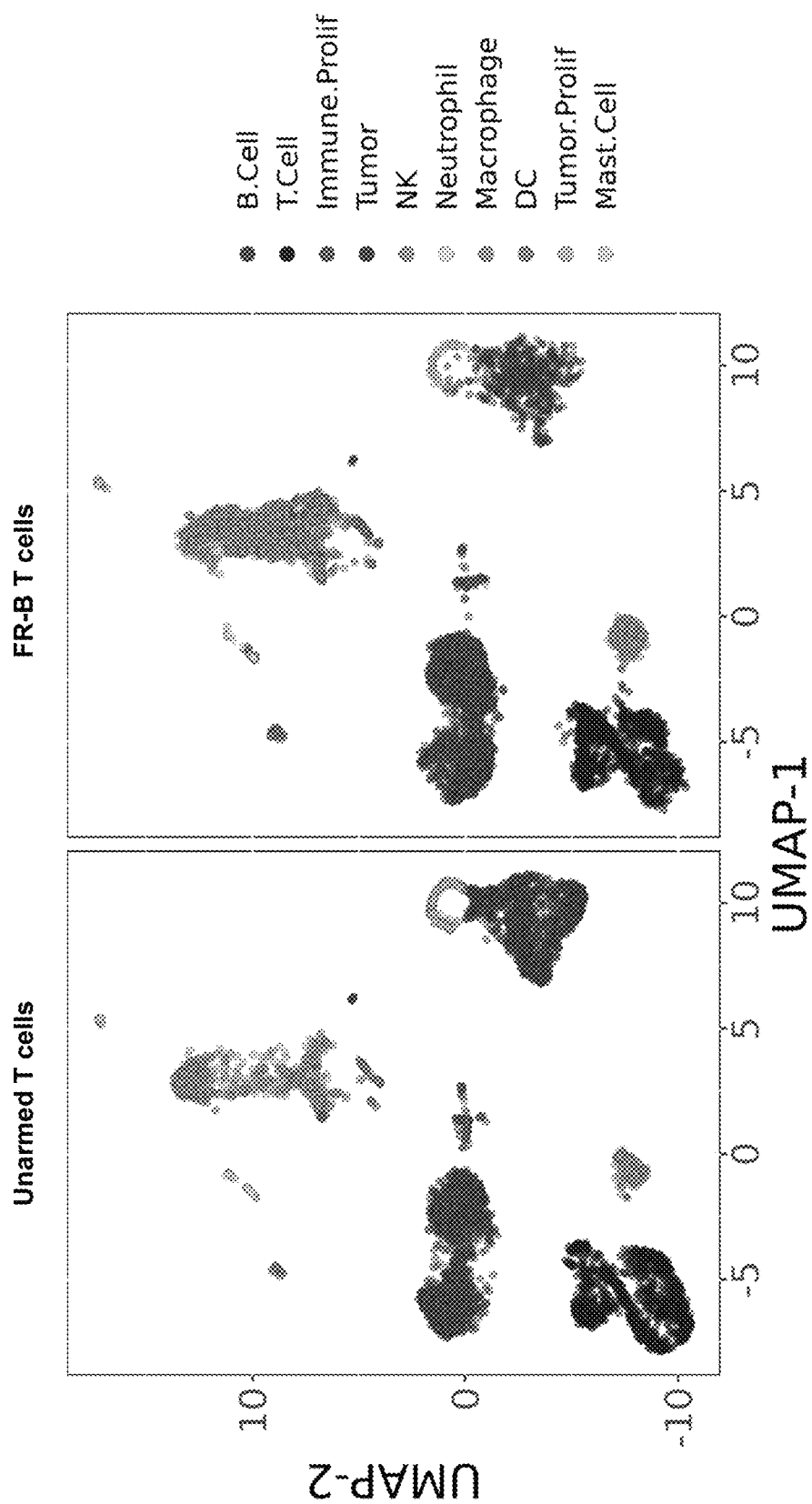
FIG. 3A. UMAP plots demonstrating broad impact of FR-B T cell therapy on the OC tumor microenvironment of IE9-mp1-hFRa tumor-bearing mice 7 days post adoptive transfer of FR-B T cells or Unarmed Control T cells. The terms "FR-B" and "FR B" and used herein refer to a secreted BiTE that contains a single-chain variable fragment (scFv) that binds to murine CD3ε and an scFv that binds to human FRα.
Figure 3B:
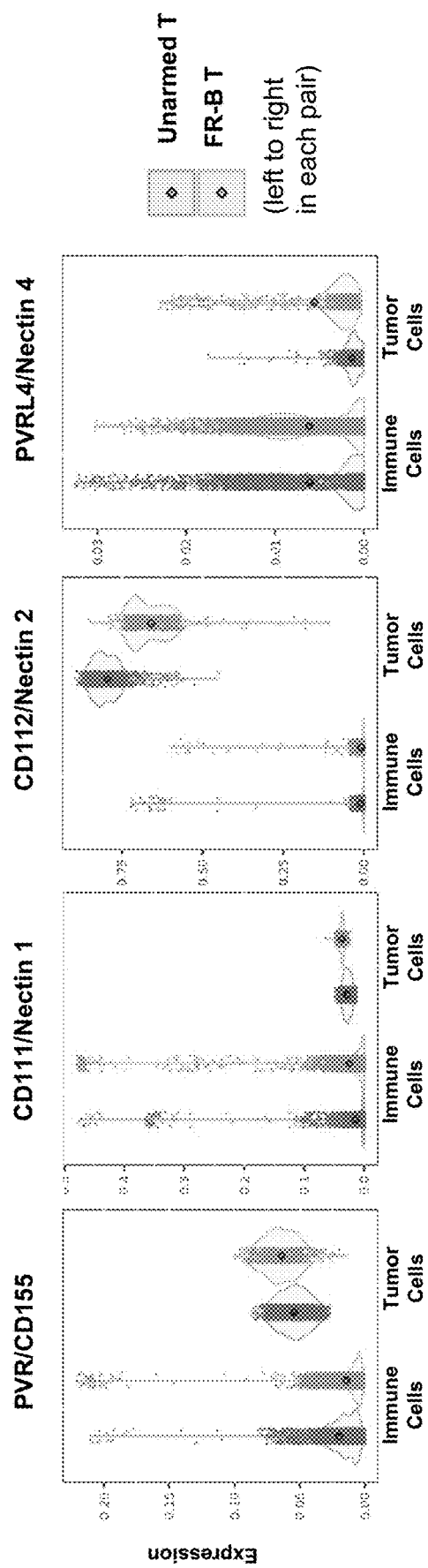
FIG. 3B. Expression of PVR, CD111, CD112, and PVRL4 by immune cells and tumor cells following treatment with Unarmed or FR-B T cells as in A).

This Example relates to FIG. 3 and an OC model showing PVR and other nectin family ligands are expressed by tumor and immune cells. The data in the panels of FIG. 3 demonstrate 1) upregulation of PVR on tumor cells following FR-B T cell therapy in vivo and 2) PVR and other nectin family ligands are expressed by tumor and other immune cells in the TME thereby supporting broad potential targets for the described approaches.

Example 4

Figure 4A:
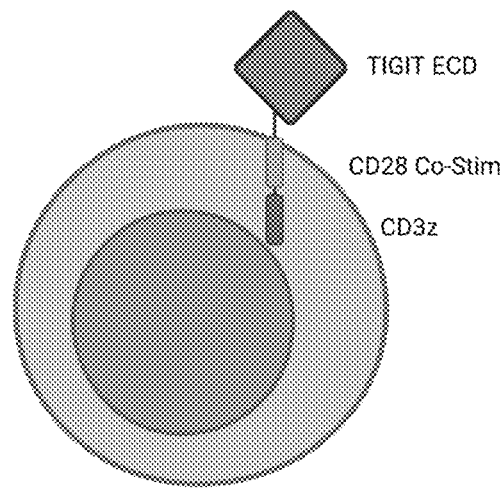
FIG. 4A. Leveraging the high affinity of PVR (CD155) for TIGIT, the extracellular domain (ECD) of TIGIT was used as the binding domain in the constructed CARs. T cell engineering involved retroviral transduction to produce $^{PVR}$-CAR T cells.
Figure 4B:
FIG. 4B. Mouse PVR CAR ($^{mPVR}$CAR); MSCV-based retroviral vector, with CD8a hinge.
Figure 4C:
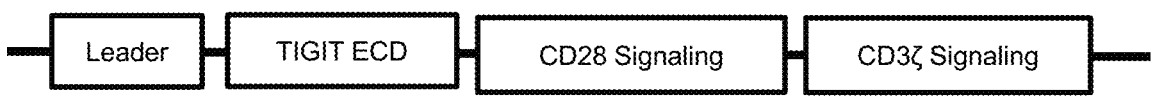
FIG. 4C. Human PVR CAR ($^{hPVR}$CAR); MSCV-based retroviral vector, with no CD8a hinge.
Figure 5A:
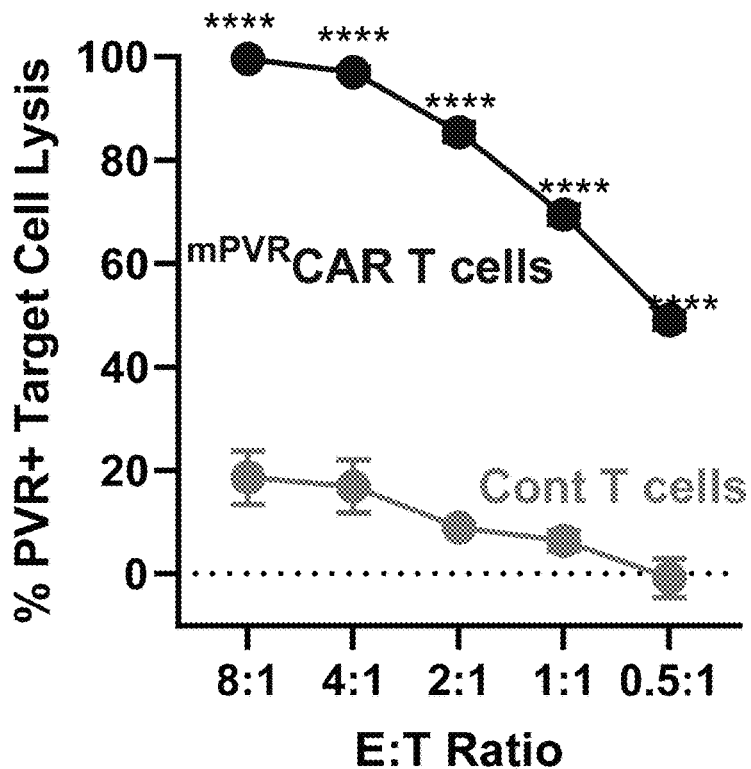
FIG. 5A. $^{mPVR}$CAR T cells (or unarmed control T cells) were co-cultured with IE9-Fluc (PVR+OC) target cells for 48 hrs at the indicated E:T Ratios to assess target cell cytotoxicity.
Figure 5B:
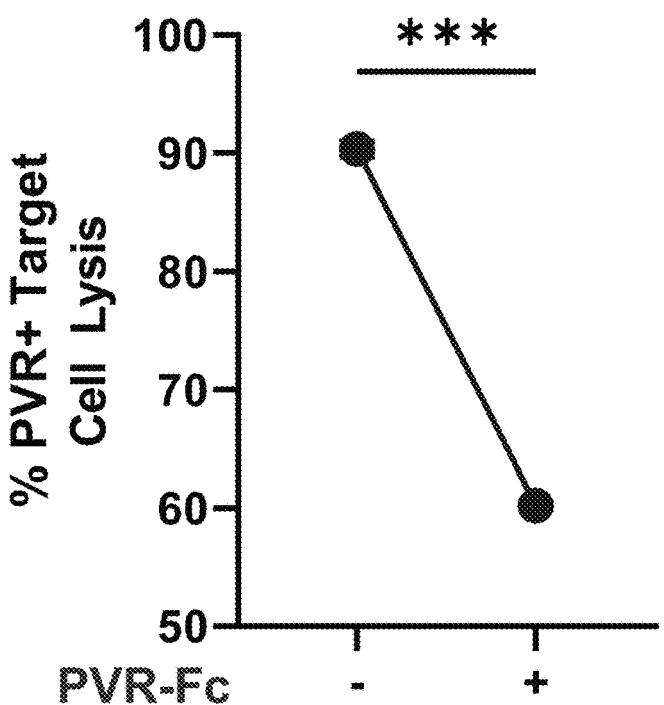
FIG. 5B. Cytotoxicity of $^{mPVR}$CAR T cells against IE9-Fluc cells was measured in the presence or absence of PVR-Fc (30 µg/ml) for 24 hrs.
Figure 5C:
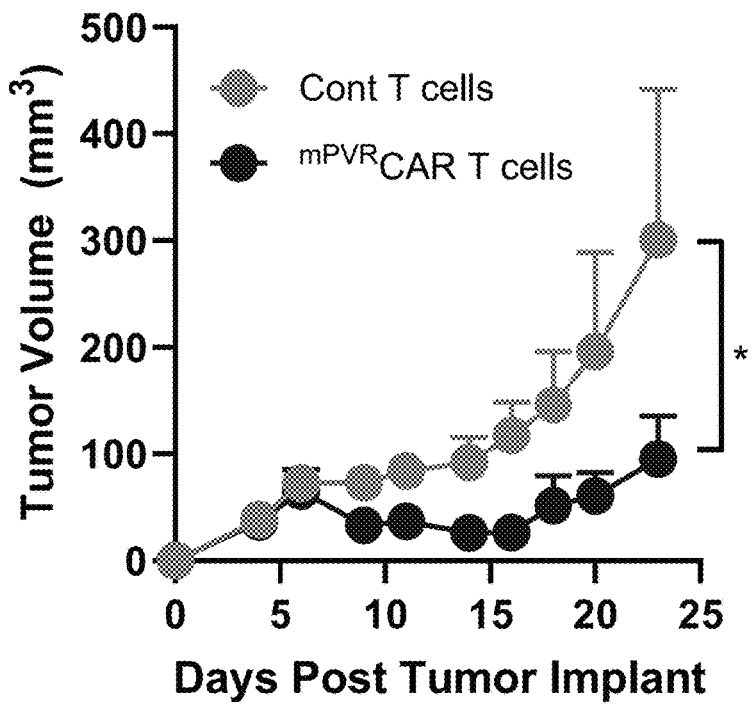
FIG. 5C. MC38 (PVR+ Colorectal cancer model) tumor-bearing mice (SQ tumors) were treated on day 5 with $7.1 \times 10^5$ $^{mPVR}$CAR T cells or an equal number of unarmed control T cells by peritumoral delivery (administered directly under growing tumors).
Figure 5D:
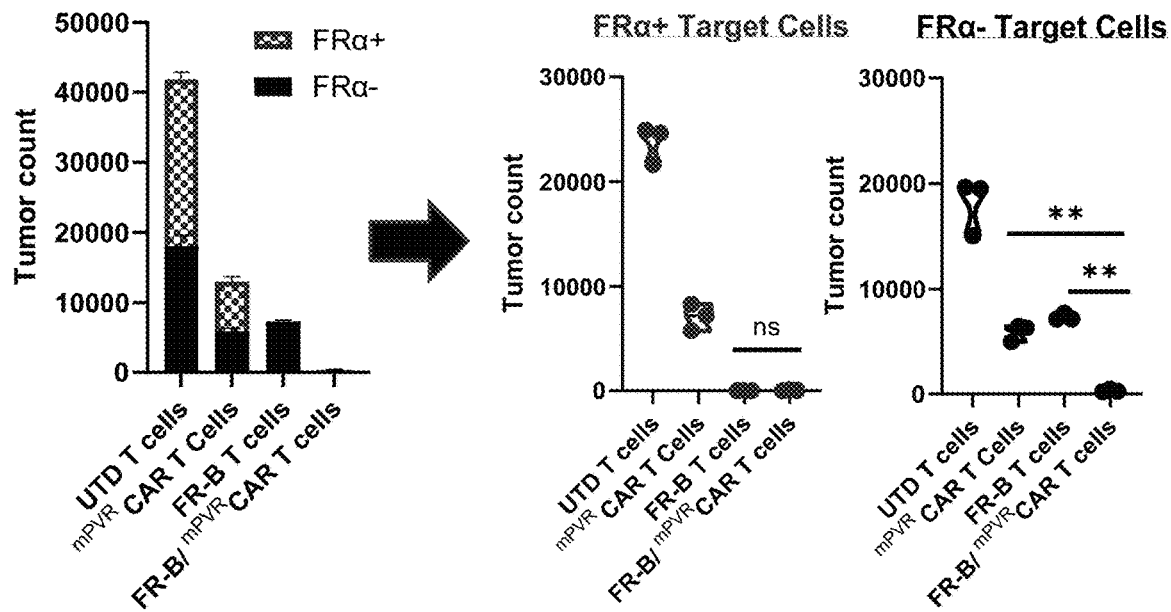
FIG. 5D. IE9-mp1-hFRa (FRα+) and IE9-mp1 (FRα−) OC cells were mixed 50:50 and co-cultured with Unarmed, $^{mPVR}$CAR, FR-B, or dual armed FR-B/$^{mPVR}$CAR murine T cells at an 8:1 E:T ratio for 48 hrs.
Figure 6A:
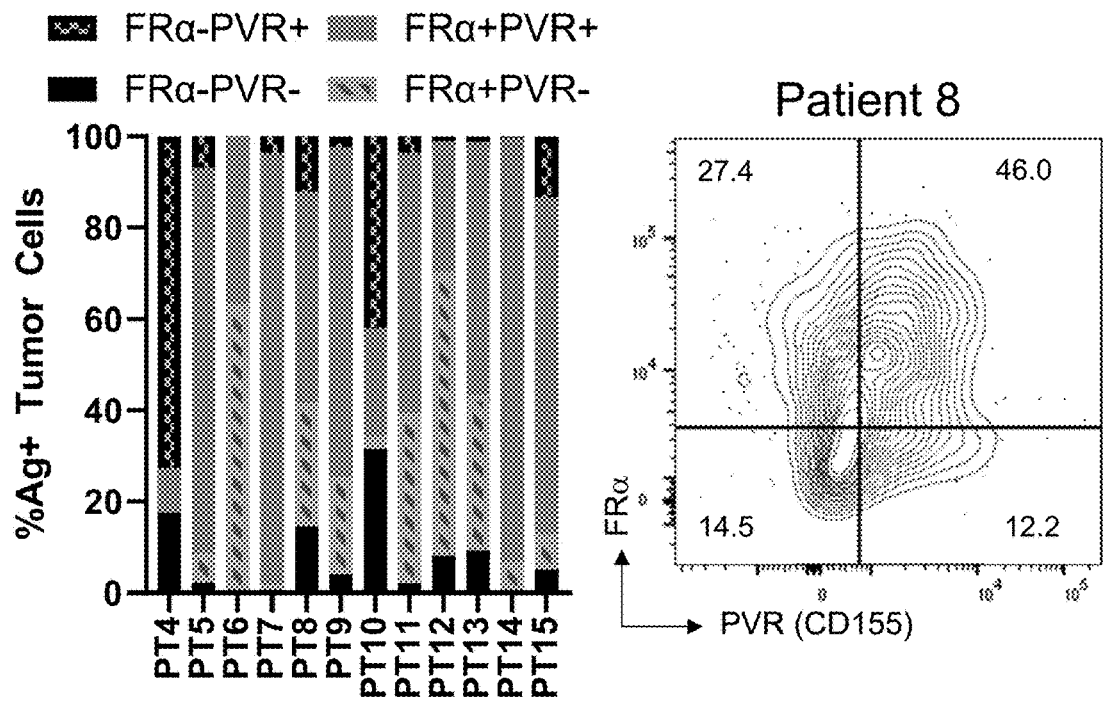
FIG. 6A. Phenotypic analysis of surface FRα and PVR on tumor cells from 12 OC patient samples (Cohort #2), demonstrating heterogenous expression on both target antigens.
Figure 6B:
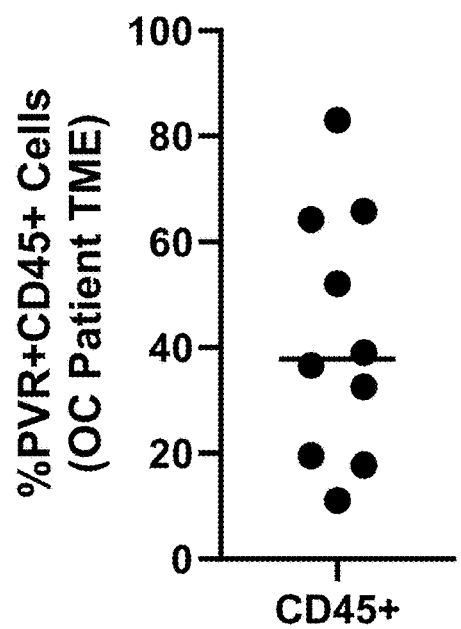
FIG. 6B. PVR+CD45+ immune cells from OC patient samples show variable expression of PVR (n=10 OC patients, Cohort #2).
Figure 6C:
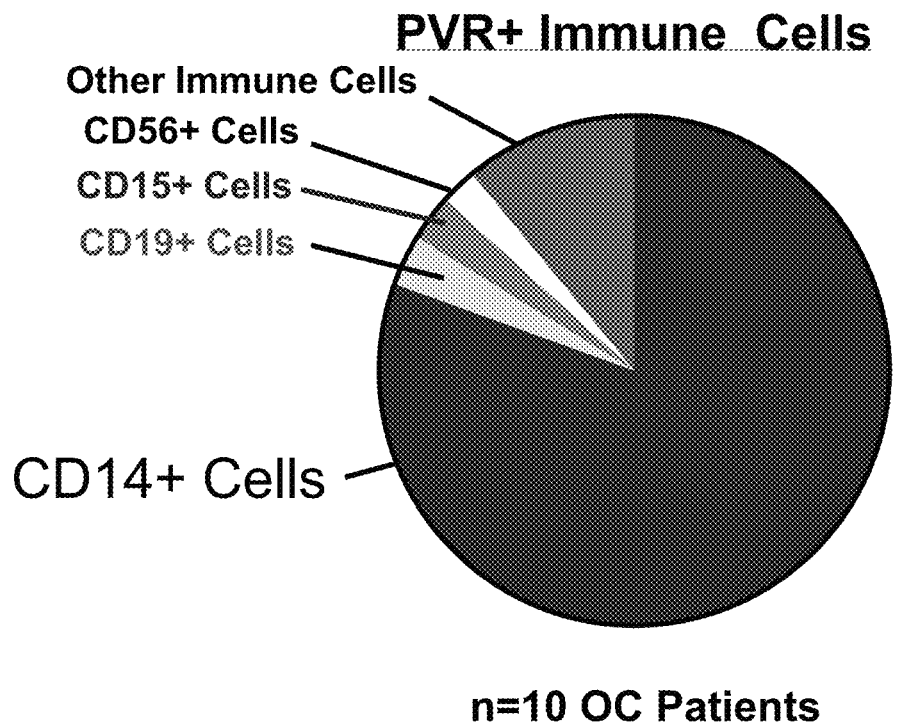
FIG. 6C. Surface PVR expression across immune cell subsets in the OC TME, with highest proportion of PVR+ cells observed to be CD14+ Myeloid cells.
Figure 6C:
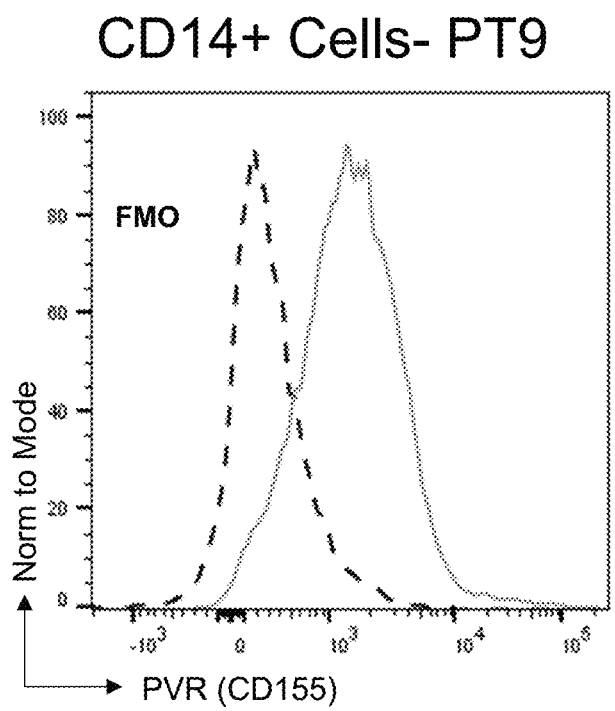
Figure 7A:
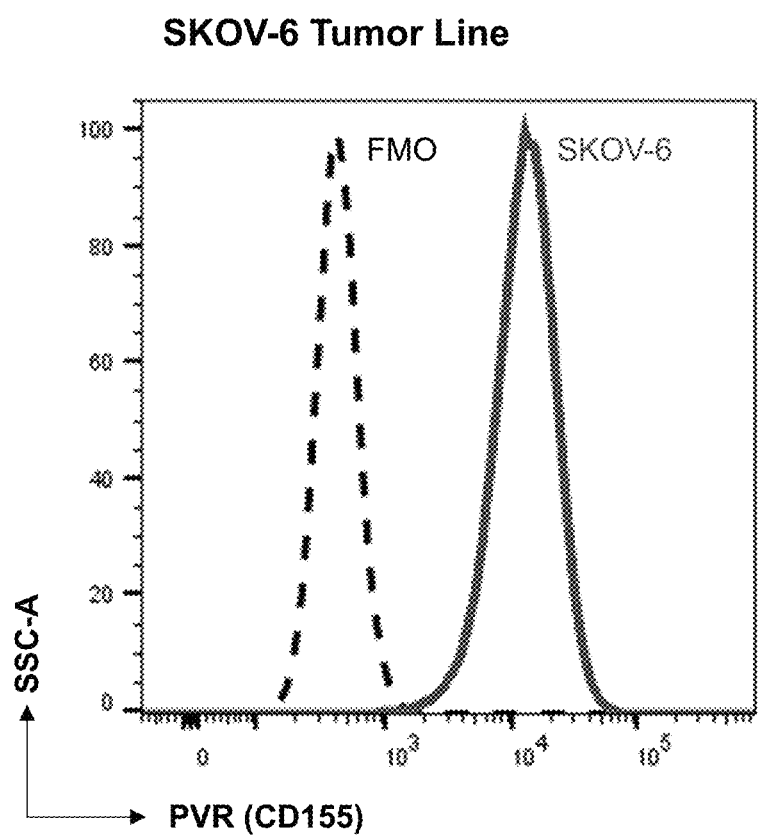
FIG. 7A. Validation stain of SKOV-6 tumor cell line for PVR expression to use as a candidate target to test $^{hPVR}$CAR T cells.
Figure 7B:
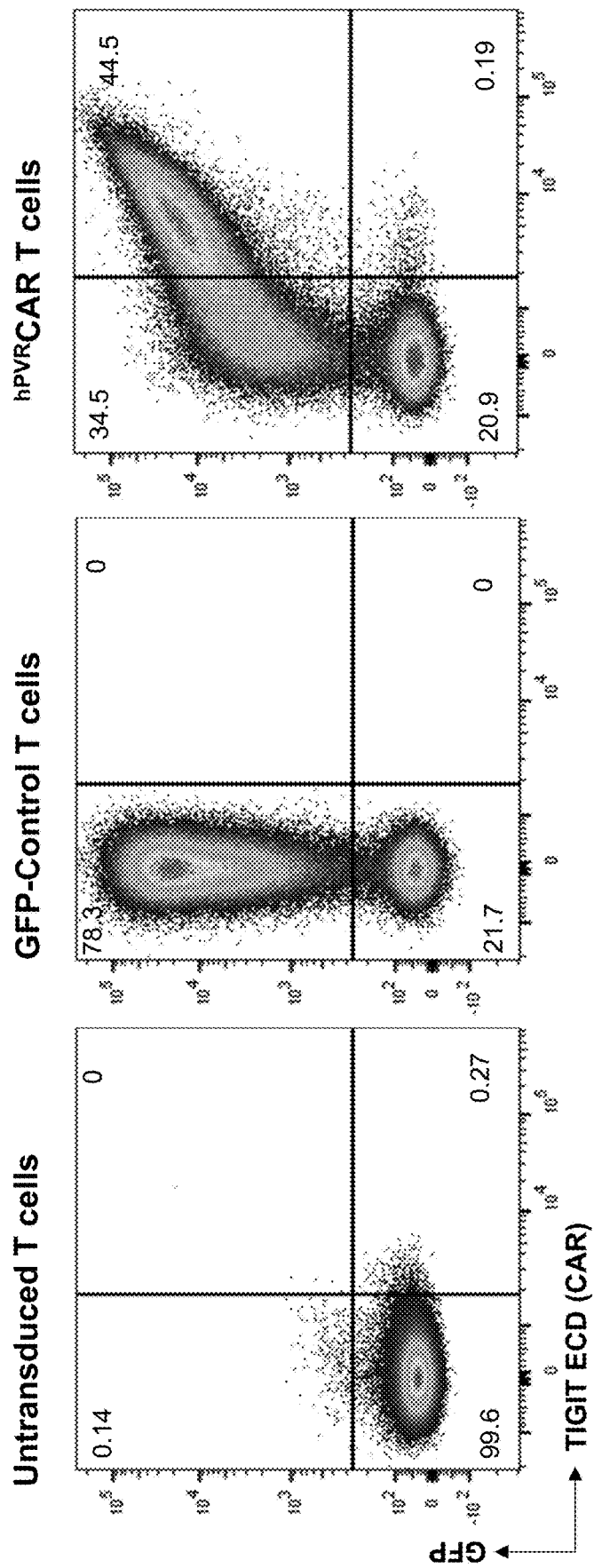
FIG. 7B. Transduction of human T cells to express $^{hPVR}$CAR T cells, GFP+TIGIT ECD+. GFP included in the construct to detect transduction efficiency, while TIGIT ECD used to detect the CAR construct on the T cell surface.
Figure 7C:
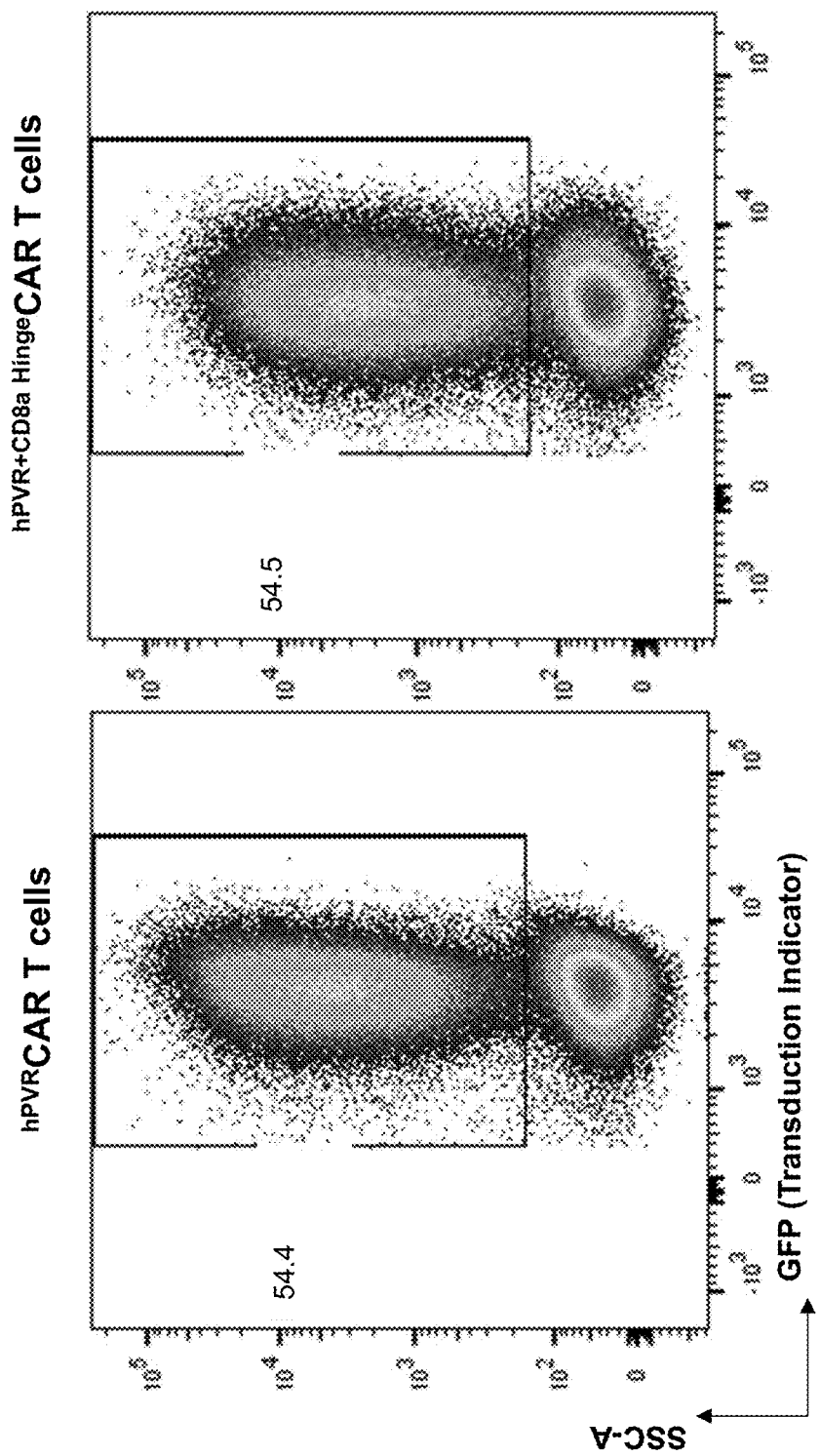
FIG. 7C. Transduction of $^{hPVR}$CAR T cells with and without CD8a hinge.
Figure 7D:
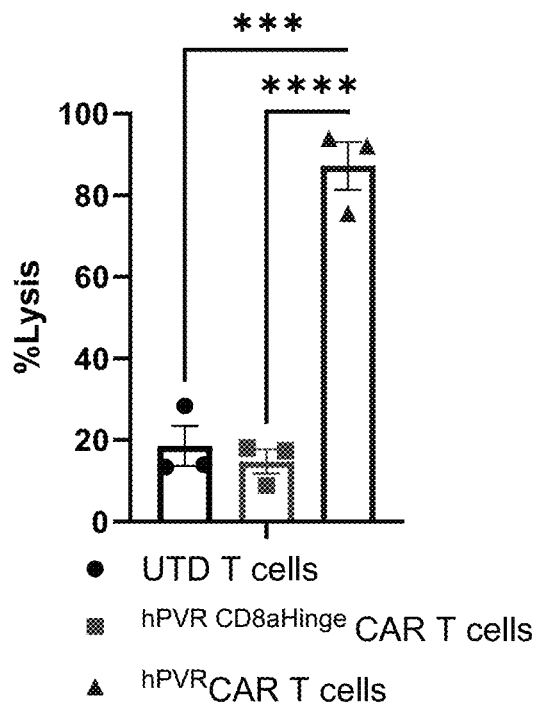
FIG. 7D. Initial 24 hr killing assay with SKOV-6 target cells at a 16:1 E:T ratio to compare the lytic function of $^{hPVR+CD8a\ hinge}$CAR T cells to $^{hPVR}$CAR T Cells, the latter of which does not include the CD8 hinge.
Figure 7E:
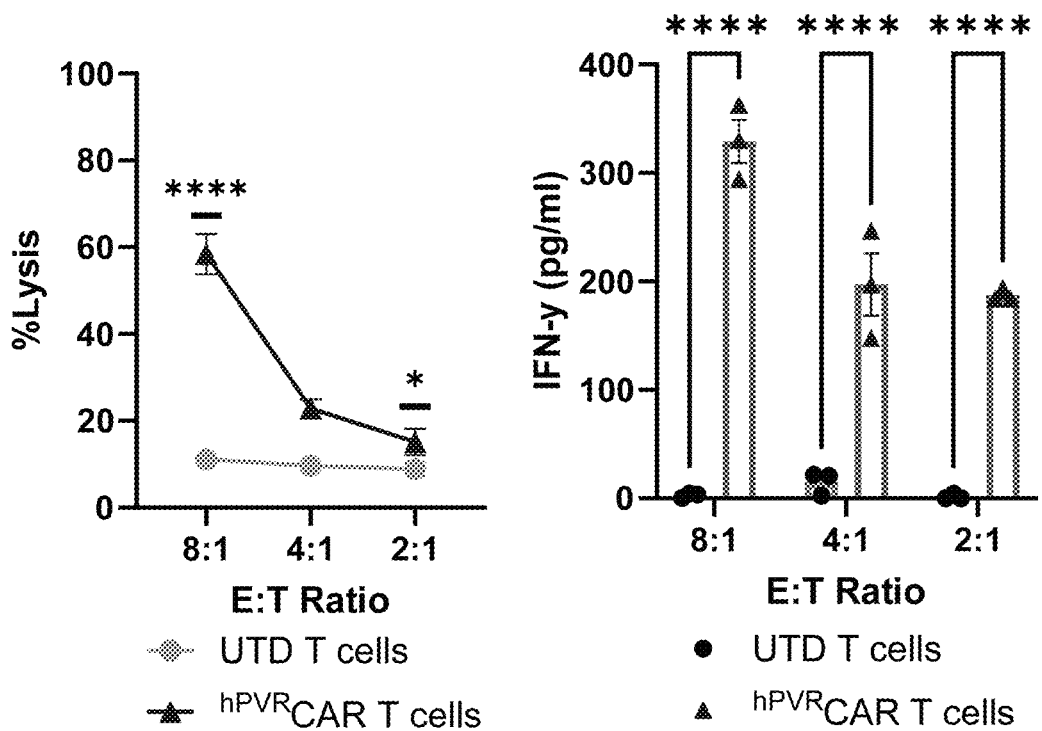
FIG. 7E. Further functional testing of $^{hPVR}$CAR T cells, repeat 24 hr co-culture with SKOV-6 at 8:1, 4:1 and 2:1 E:T ratios; measurement of target cell lysis and IFN-γ production (measured by ELISA) post co-culture.

This Example relates to FIG. 4 and generation of PVR-targeted CAR T cells (PVR CAR). FIG. 4A relates to use of the high affinity of PVR (CD155) for TIGIT, wherein the extracellular domain (ECD) of TIGIT was used as the binding domain in the constructed CARs. FIG. 4B shows a diagram of a mouse PVR CAR ($^{mPVR}$CAR); MSCV-based retroviral vector, with CD8a hinge, wherein the hinge sequence is as described above. FIG. 4C shows diagram of a human PVR CAR ($^{hPVR}$CAR); MSCV-based retroviral vector, with no CD8a hinge, wherein a representative excluded sequence is LSNSIMYFSHFVPVFLPAKPTTT-PAPRPPTPAPTIASQPLSLRPEACRPAAGGAVHTRG LD (SEQ ID NO:10). These constructs relate in part to a recent publication of a human PVR CAR construct that uses a CD8 hinge in the design of the CAR (Pan C, Zhai Y, Wang C, et al. *Poliovirus receptor-based chimeric antigen receptor T cells combined with NK-92 cells exert potent activity against glioblastoma.* J Natl Cancer Inst. 2024; 116(3):389-400. doi:10.1093/jnci/djad226). Without intending to be constrained by any particular theory, it is considered that the CD8 hinge used in this reference comprises the aforementioned hinge sequence. In this disclosure, the effect of a CAR that does not comprise the aforementioned excluded CD8 hinge sequence was comparted to a CAR that does comprise the hinge sequence. The results are shown in FIG. 7E and are discussed below.

Example 5

This Example relates to FIG. 5 which shows that $^{mPVR}$CAR T cells are functionally active, produce therapeutic efficacy, and can be rationally combined with FR-B T cells in a dual-armed T cell format. FIG. 5A demonstrates cytotoxicity of PVR CAR T cells against PVR+ target cells. FIG. 5B demonstrates activity of $^{mPVR}$CAR T cells and that they can be therapeutically regulated to enhance safety through delivery of soluble PVR-Fc. These data, in addition to the design of the CAR to include the TIGIT ECD, support an alternate approach for enhancing safety by using anti-TIGIT function blocking antibodies. FIG. 5C demonstrates therapeutic activity of $^{mPVR}$CAR T cells against growing tumors. FIG. 5D demonstrates that concurrently targeting FRα and PVR using dual engineered T cells can effectively overcome FRα heterogeneity.

Example 6

This Example replates to FIG. 6 which shows PVR can complement FRα targeting in the context of clinical OC, with PVR expressed on both tumor and immune cells. FIG. 6A demonstrates the rationale of targeting FRα and PVR as complementary antigens to broaden tumor targeting in clinical OC. FIG. 6B demonstrates PVR is also expressed on immune cells that accumulate in the OC tumor microenvironment (TME). FIG. 6C demonstrates that accumulating myeloid cells in the TME are likely to be actively targeted by $^{PVR}$CAR T cells.

Example 7

This Example relates to FIG. 7 and provides functional validation of $^{hPVR}$CAR: Successful T cell transduction and effective targeting of PVR+ cancer cells. FIG. 7A demonstrates PVR expression is high on SKOV-6 tumor line, a preferable target line to test human ($^{hPVR}$CAR T cells). FIG. 7B demonstrates the ability to transduce human T cells to express the $^{hPVR}$CAR T cells to be used in functional assays. FIG. 7C provides data demonstrating that both described constructs were successfully transduced into T cells for functional testing. FIG. 7D provides data demonstrating that the addition of a CD8a hinge in the PVR CAR construct reduced the cytotoxicity of $^{PVR}$CAR T cells, whereas a human CAR construct ($^{hPVR}$CAR T cells) that does not include the described hinge was functional against PVR+ SKOV-6.

---

SEQUENCE LISTING

```
Sequence total quantity: 17
SEQ ID NO: 1            moltype = AA  length = 120
FEATURE                 Location/Qualifiers
source                  1..120
                        mol_type = protein
                        organism = synthetic construct
SEQUENCE: 1
MMTGTIETTG NISAEKGGSI ILQCHLSSTT AQVTQVNWEQ QDQLLAICNA DLGWHISPSF   60
KDRVAPGPGL GLTLQSLTVN DTGEYFCIYH TYPDGTYTGR IFLEVLESSV AEHGARFQIP  120

SEQ ID NO: 2            moltype = AA  length = 219
FEATURE                 Location/Qualifiers
source                  1..219
                        mol_type = protein
                        organism = synthetic construct
SEQUENCE: 2
IEVMYPPPYL DNEKSNGTII HVKGKHLCPS PLFPGPSKPF WVLVVVGGVL ACYSLLVTVA   60
FIIFWVRSKR SRLLHSDYMN MTPRRPGPTR KHYQPYAPPR DFAAYRSRVK FSRSADAPAY  120
QQGQNQLYNE LNLGRREEYD VLDKRRGRDP EMGGKPRRKN PQEGLYNELQ KDKMAEAYSE  180
IGMKGERRRG KGHDGLYQGL STATKDTYDA LHMQALPPR                         219

SEQ ID NO: 3            moltype = AA  length = 242
FEATURE                 Location/Qualifiers
source                  1..242
                        mol_type = protein
                        organism = synthetic construct
SEQUENCE: 3
DIELTQSPAS LAVSLGQRAI ISCKASQSVS FAGTSLMHWY HQKPGQQPKL LIYRASNLEA   60
GVPTRFSGSG SKTDFTLNIH PVEEEDAATY YCQQSREYPY TFGGGTKLEI KGSTSGSGKS  120
SEGKGQVQLQ QSGAELVKPG ASVKISCKAS GYSFTGYFMN WVKQSHGKSL EWIGRIHPYD  180
GDTFYNQNFK DKATLTVDKS SNTAHMELLS LTSEDFAVYY CTRYDGSRAM DYWGQGTTVT  240
VS                                                                 242
```

```
SEQ ID NO: 4              moltype = AA  length = 250
FEATURE                   Location/Qualifiers
source                    1..250
                          mol_type = protein
                          organism = synthetic construct
SEQUENCE: 4
MDIQMTQTTS SLSASLGDRV TISCRASQDI RNYLNWYQQK PDGTVKLLIY YTSRLHSGVP  60
SKFSGSGSGT DYSLTISNLE QEDIATYFCQ QGNTLPWTFA GGTKLEIKGG GGSGGGGSGG 120
GGSGGGGSEV QLQQSGPELV KPGASMKISC KASGYSFTGY TMNWVKQSHG KNLEWMGLIN 180
PYKGVSTYNQ KFKDKATLTV DKSSSTAYME LLSLTSEDSA VYYCARSGYY GDSDWYFDVW 240
GQGTTLTVFS                                                       250

SEQ ID NO: 5              moltype = AA  length = 360
FEATURE                   Location/Qualifiers
source                    1..360
                          mol_type = protein
                          organism = synthetic construct
SEQUENCE: 5
MALPVTALLL PLALLLHAMM TGTIETTGNI SAEKGGSIIL QCHLSSTTAQ VTQVNWEQQD  60
QLLAICNADL GWHISPSFKD RVAPGPGLGL TLQSLTVNDT GEYFCIYHTY PDGTYTGRIF 120
LEVLESSVAE HGARFQIPGS AIEVMYPPPY LDNEKSNGTI IHVKGKHLCP SPLFPGPSKP 180
FWVLVVGGV LACYSLLVTV AFIIFWVRSK RSRLLHSDYM NMTPRRPGPT RKHYQPYAPP 240
RDFAAYRSRV KFSRSADAPA YQQGQNQLYN ELNLGRREEY DVLDKRRGRD PEMGGKPRRK 300
NPQEGLYNEL QKDKMAEAYS EIGMKGERRR GKGHDGLYQG LSTATKDTYD ALHMQALPPR 360

SEQ ID NO: 6              moltype = AA  length = 35
FEATURE                   Location/Qualifiers
source                    1..35
                          mol_type = protein
                          organism = synthetic construct
SEQUENCE: 6
MALPVTALLL PLALLLHAMM TGTIETTGNI SAEKG                             35

SEQ ID NO: 7              moltype = AA  length = 508
FEATURE                   Location/Qualifiers
source                    1..508
                          mol_type = protein
                          organism = synthetic construct
SEQUENCE: 7
MDIQMTQTTS SLSASLGDRV TISCRASQDI RNYLNWYQQK PDGTVKLLIY YTSRLHSGVP  60
SKFSGSGSGT DYSLTISNLE QEDIATYFCQ QGNTLPWTFA GGTKLEIKGG GGSGGGGSGG 120
GGSGGGGSEV QLQQSGPELV KPGASMKISC KASGYSFTGY TMNWVKQSHG KNLEWMGLIN 180
PYKGVSTYNQ KFKDKATLTV DKSSSTAYME LLSLTSEDSA VYYCARSGYY GDSDWYFDVW 240
GQGTTLTVFS GEAAAKEAAA KEAAAKDIEL TQSPASLAVS LGQRAIISCK ASQSVSFAGT 300
SLMHWYHQKP GQQPKLLIYR ASNLEAGVPT RFSGSGSKTD FTLNIHPVEE EDAATYYCQQ 360
SREYPYTFGG GTKLEIKGST SGSGKSSEGK GQVQLQQSGA ELVKPGASVK ISCKASGYSF 420
TGYFMNWVKQ SHGKSLEWIG RIHPYDGDTF YNQNFKDKAT LTVDKSSNTA HMELLSLTSE 480
DFAVYYCTRY DGSRAMDYWG QGTTVTVS                                   508

SEQ ID NO: 8              moltype = AA  length = 527
FEATURE                   Location/Qualifiers
source                    1..527
                          mol_type = protein
                          organism = synthetic construct
SEQUENCE: 8
MNSGLQLVFF VLTLKGIQGM DIQMTQTTSS LSASLGDRVT ISCRASQDIR NYLNWYQQKP  60
DGTVKLLIYY TSRLHSGVPS KFSGSGSGTD YSLTISNLEQ EDIATYFCQQ GNTLPWTFAG 120
GTKLEIKGGG GSGGGGSGGG GSGGGGSEVQ LQQSGPELVK PGASMKISCK ASGYSFTGYT 180
MNWVKQSHGK NLEWMGLINP YKGVSTYNQK FKDKATLTVD KSSSTAYMEL LSLTSEDSAV 240
YYCARSGYYG DSDWYFDVWG QGTTLTVFSG EAAAKEAAAK EAAAKDIELT QSPASLAVSL 300
GQRAIISCKA SQSVSFAGTS LMHWYHQKPG QQPKLLIYRA SNLEAGVPTR FSGSGSKTDF 360
TLNIHPVEEE DAATYYCQQS REYPYTFGGG TKLEIKGSTS GSGKSSEGKG QVQLQQSGAE 420
LVKPGASVKI SCKASGYSFT GYFMNWVKQS HGKSLEWIGR IHPYDGDTFY NQNFKDKATL 480
TVDKSSNTAH MELLSLTSED FAVYYCTRYD GSRAMDYWG GTTVTVS                527

SEQ ID NO: 9              moltype = AA  length = 19
FEATURE                   Location/Qualifiers
source                    1..19
                          mol_type = protein
                          organism = synthetic construct
SEQUENCE: 9
MNSGLQLVFF VLTLKGIQG                                               19

SEQ ID NO: 10             moltype = AA  length = 61
FEATURE                   Location/Qualifiers
source                    1..61
                          mol_type = protein
                          organism = synthetic construct
SEQUENCE: 10
```

-continued

```
LSNSIMYFSH FVPVFLPAKP TTTPAPRPPT PAPTIASQPL SLRPEACRPA AGGAVHTRGL   60
D                                                                   61

SEQ ID NO: 11            moltype = AA  length = 496
FEATURE                  Location/Qualifiers
source                   1..496
                         mol_type = protein
                         organism = synthetic construct
SEQUENCE: 11
EVQLVESGGG LVQPGKSLKL SCEASGFTFS GYGMHWVRQA PGRGLESVAY ITSSSINIKY   60
ADAVKGRFTV SRDNAKNLLF LQMNILKSED TAMYYCARFD WDKNYWGQGT MVTVSSGGGG  120
SGGGGSGGGG SDIQMTQSPS SLPASLGDRV TINCQASQDI SNYLNWYQQK PGKAPKLLIY  180
YTNKLADGVP SRFSGSGSGR DSSFTISSLE SEDIGSYYCQ QYYNYPWTFG PGTKLEIKGE  240
AAAKEAAAKE AAAKDIELTQ SPASLAVSLG QRAIISCKAS QSVSFAGTSL MHWYHQKPGQ  300
QPKLLIYRAS NLEAGVPTRF SGSGSKTDFT LNIHPVEEED AATYYCQQSR EYPYTFGGGT  360
KLEIKGSTSG SGKSSEGKGQ VQLQQSGAEL VKPGASVKIS CKASGYSFTG YFMNWVKQSH  420
GKSLEWIGRI HPYDGDTFYN QNFKDKATLT VDKSSNTAHM ELLSLTSEDF AVYYCTRYDG  480
SRAMDYWGQG TTVTVS                                                  496

SEQ ID NO: 12            moltype = AA  length = 21
FEATURE                  Location/Qualifiers
source                   1..21
                         mol_type = protein
                         organism = synthetic construct
SEQUENCE: 12
MDFQVQIFSF LLISASVIMS R                                             21

SEQ ID NO: 13            moltype = AA  length = 120
FEATURE                  Location/Qualifiers
source                   1..120
                         mol_type = protein
                         organism = synthetic construct
SEQUENCE: 13
TIDTKRNISA EEGGSVILQC HFSSDTAEVT QVDWKQQDQL LAIYSVDLGW HVASVFSDRV   60
VPGPSLGLTF QSLTMNDTGE YFCTYHTYPG GIYKGRIFLK VQESSDDRNG LAQFQTAPLG  120

SEQ ID NO: 14            moltype = AA  length = 62
FEATURE                  Location/Qualifiers
source                   1..62
                         mol_type = protein
                         organism = synthetic construct
SEQUENCE: 14
VISNSVMYFS SVVPVLQKVN STTTKPVLRT PSPVHPTGTS QPQRPEDCRP RGSVKGTGLD   60
FA                                                                  62

SEQ ID NO: 15            moltype = AA  length = 68
FEATURE                  Location/Qualifiers
source                   1..68
                         mol_type = protein
                         organism = synthetic construct
SEQUENCE: 15
FWALVVVAGV LFCYGLLVTV ALCVIWTNSR RNRLLQSDYM NMTPRRPGLT RKPYQPYAPA   60
RDFAAYRP                                                            68

SEQ ID NO: 16            moltype = AA  length = 114
FEATURE                  Location/Qualifiers
source                   1..114
                         mol_type = protein
                         organism = synthetic construct
SEQUENCE: 16
LRAKFSRSAE TAANLQDPNQ LYNELNLGRR EEYDVLEKKR ARDPEMGGKQ QRRRNPQEGV   60
YNALQKDKMA EAYSEIGTKG ERRRGKGHDG LYQGLSTATK DTYDALHMQT LAPR        114

SEQ ID NO: 17            moltype = AA  length = 392
FEATURE                  Location/Qualifiers
source                   1..392
                         mol_type = protein
                         organism = synthetic construct
SEQUENCE: 17
MDFQVQIFSF LLISASVIMS RTIDTKRNIS AEEGGSVILQ CHFSSDTAEV TQVDWKQQDQ   60
LLAIYSVDLG WHVASVFSDR VVPGPSLGLT FQSLTMNDTG EYFCTYHTYP GGIYKGRIFL  120
KVQESSDDRN GLAQFQTAPL GRIRLSSAVI SNSVMYFSSV VPVLQKVNST TTKPVLRTPS  180
PVHPTGTSQP QRPEDCRPRG SVKGTGLDFA FWALVVVAGV LFCYGLLVTV ALCVIWTNSR  240
RNRLLQSDYM NMTPRRPGLT RKPYQPYAPA RDFAAYRPLR AKFSRSAETA ANLQDPNQLY  300
NELNLGRREE YDVLEKKRAR DPEMGGKQQR RRNPQEGVYN ALQKDKMAEA YSEIGTKGER  360
RRGKGHDGLY QGLSTATKDT YDALHMQTLA PR                                392
```

What is claimed is:

1. A method of treating ovarian cancer in an individual by administering to the individual modified T cells, wherein the modified T cells are modified i) to express a chimeric antigen receptor (CAR), the CAR comprising a T cell immunoreceptor with immunoglobulin and tyrosine-based inhibitory motif (TIGIT) extracellular domain that can bind to poliovirus receptor (PVR), a CD28 segment, and a CD3ζ segment; and ii) to express and secrete a Bi-specific T cell engager (BiTE), wherein the BiTE includes a segment that can specifically bind to human Folate Receptor alpha (FRα) and a segment that that can specifically bind to a human CD3ε segment.

2. The method of claim 1, wherein the TIGIT extracellular domain, the CD28 segment and the CD3ζ segments are human segments.

3. The method of claim 2, wherein the modified cells are human T cells.

4. The method of claim 3, wherein:

```
a) the TIGIT extracellular domain comprises the sequence
                                                        (SEQ ID NO: 1)
MMTGTIETTGNISAEKGGSIILQCHLSSTTAQVTQVNWEQQDQLLAICNADLGWHISP

SFKDRVAPGPGLGLTLQSLTVNDTGEYFCIYHTYPDGTYTGRIFLEVLESSVAEHGAR

FQIP;
and b) the CD28 segment and the CD3ζ segment, comprises the sequence
                                                        (SEQ ID NO: 2)
IEVMYPPPYLDNEKSNGTIIHVKGKHLCPSPLFPGPSKPFWVLVVVGGVLACYSLLVT

VAFIIFWVRSKRSRLLHSDYMNMTPRRPGPTRKHYQPYAPPRDFAAYRSRVKFSRSA

DAPAYQQGQNQLYNELNLGRREEYDVLDKRRGRDPEMGGKPRRKNPQEGLYNELQ

KDKMAEAYSEIGMKGERRRGKGHDGLYQGLSTATKDTYDALHMQALPPR;
and c) the segment of the BiTE that specifically binds to the human Folate
Receptor alpha (FRα) comprises the amino acid sequence
                                                        (SEQ ID NO: 3)
DIELTQSPASLAVSLGQRAIISCKASQSVSFAGTSLMHWYHQKPGQQPKLLIYRASNL

EAGVPTRESGSGSKTDFTLNIHPVEEEDAATYYCQQSREYPYTFGGGTKLEIKGSTSG

SGKSSEGKGQVQLQQSGAELVKPGASVKISCKASGYSFTGYFMNWVKQSHGKSLE

WIGRIHPYDGDTFYNQNFKDKATLTVDKSSNTAHMELLSLTSEDFAVYYCTRYDGS

RAMDYWGQGTTVTVS;
and d) the segment that specifically binds to the human CD38 segment comprises
the amino acid sequence
                                                        (SEQ ID NO: 4)
MDIQMTQTTSSLSASLGDRVTISCRASQDIRNYLNWYQQKPDGTVKLLIYYTSRLHS

GVPSKFSGSGSGTDYSLTISNLEQEDIATYFCQQGNTLPWTFAGGTKLEIKGGGGSG

GGGSGGGGSGGGGSEVQLQQSGPELVKPGASMKISCKASGYSFTGYTMNWVKQS

HGKNLEWMGLINPYKGVSTYNQKFKDKATLTVDKSSSTAYMELLSLTSEDSAVYYC

ARSGYYGDSDWYFDVWGQGTTLTVFS.
```

5. The method of claim 4, wherein the CAR comprises the sequence

```
                                                        (SEQ ID NO: 5)
MALPVTALLLPLALLLHAMMTGTIETTGNISAEKGGSIILQCHLSSTTA

QVTQVNWEQQDQLLAICNADLGWHISPSFKDRVAPGPGLGLTLQSLTVN

DTGEYFCIYHTYPDGTYTGRIFLEVLESSVAEHGARFQIPGSAIEVMYP

PPYLDNEKSNGTIIHVKGKHLCPSPLFPGPSKPFWVLVVVGGVLACYSL

LVTVAFIIFWVRSKRSRLLHSDYMNMTPRRPGPTRKHYQPYAPPRDFAA

YRSRVKFSRSADAPAYQQGQNQLYNELNLGRREEYDVLDKRRGRDPEMG

GKPRRKNPQEGLYNELQKDKMAEAYSEIGMKGERRRGKGHDGLYQGLST

ATKDTYDALHMQALPPR.
```

6. The method of claim 5, wherein the CAR does not comprise a CD8 hinge region.

7. The method of claim 6, wherein the CD8 hinge region that is not comprised by the CAR comprises the sequence (SEQ ID NO: 10)
LSNSIMYFSHFVPVFLPAKPTTTPAPRPPTPAPTIASQPLSLRPEACRP

AAGGAVHTRGLD.

8. The method of claim 7, wherein the BiTE that is secreted comprises the sequence (SEQ ID NO: 7)
MDIQMTQTTSSLSASLGDRVTISCRASQDIRNYLNWYQQKPDGTVKLLI

YYTSRLHSGVPSKFSGSGSGTDYSLTISNLEQEDIATYFCQQGNTLPWT

FAGGTKLEIKGGGGSGGGGSGGGGSGGGGSEVQLQQSGPELVKPGASMK

ISCKASGYSFTGYTMNWVKQSHGKNLEWMGLINPYKGVSTYNQKFKDKA

TLTVDKSSSTAYMELLSLTSEDSAVYYCARSGYYGDSDWYFDVWGQGTT

-continued

LTVFSGEAAAKEAAAKEAAAKDIELTQSPASLAVSLGQRAIISCKASQS

VSFAGTSLMHWYHQKPGQQPKLLIYRASNLEAGVPTRESGSGSKTDFTL

NIHPVEEEDAATYYCQQSREYPYTFGGGTKLEIKGSTSGSGKSSEGKGQ

VQLQQSGAELVKPGASVKISCKASGYSFTGYFMNWVKQSHGKSLEWIGR

IHPYDGDTFYNQNFKDKATLTVDKSSNTAHMELLSLTSEDFAVYYCTRY

DGSRAMDYWGQGTTVTVS.

9. The method of claim 8, wherein the ovarian cancer comprises a solid tumor.

10. The method of claim 9, wherein the solid tumor comprises ovarian cancer cells that are PVR positive, ovarian cancer cells that are FRα positive, and ovarian cancer cells that are FRα negative.

11. The method of claim 10, wherein expression of the PVR by the FRα negative ovarian cancer cells is increased in response to engagement of the BiTE with the FRα positive ovarian cancer cells.

* * * * *